(12) United States Patent
Lewis

(10) Patent No.: US 6,556,993 B2
(45) Date of Patent: *Apr. 29, 2003

(54) METHOD AND SYSTEM FOR PROVIDING A HARDWARE SORT IN A GRAPHICS SYSTEM

(75) Inventor: Michael C. Lewis, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/003,784

(22) Filed: Nov. 15, 2001

(65) Prior Publication Data

US 2002/0040362 A1 Apr. 4, 2002

Related U.S. Application Data

(63) Continuation of application No. 09/583,063, filed on May 30, 2000, now Pat. No. 6,377,258.

(51) Int. Cl.$^7$ .......................... G06F 17/30; G06F 15/40
(52) U.S. Cl. .......................... 707/7; 345/422; 345/421; 382/197
(58) Field of Search .............................. 707/7; 345/422, 345/421, 419; 382/197; 389/197

(56) References Cited

U.S. PATENT DOCUMENTS

| 5,386,583 A | * | 1/1995 | Hendricks ........................ 707/7 |
| 5,410,689 A | * | 4/1995 | Togo et al. ...................... 707/7 |
| 5,517,603 A | * | 5/1996 | Kelley et al. ................. 345/426 |
| 5,535,384 A | * | 7/1996 | Kasahara ........................ 707/7 |
| 5,842,207 A | * | 11/1998 | Fujiwara et al. ................ 707/7 |
| 5,884,307 A | * | 3/1999 | Depledge et al. ............... 707/7 |
| 5,912,657 A | * | 6/1999 | Saito ........................... 345/139 |
| 5,949,428 A | * | 9/1999 | Toelle et al. .................. 345/589 |
| 5,963,210 A | * | 10/1999 | Lewis et al. .................. 345/419 |
| 5,977,987 A | * | 11/1999 | Duluk, Jr. .................... 345/441 |
| 6,377,258 B1 | * | 4/2002 | Lewis .......................... 345/422 |

OTHER PUBLICATIONS

Doeband, Scan Line Graphics Generation on the Massively Parallel Processor, Oct. 1988, Frontiers of Massively Parallel Computations, Proceedings 2nd Symposium on the Frontiers of, p. 327–329.*

* cited by examiner

Primary Examiner—Greta Robinson
(74) Attorney, Agent, or Firm—Sawyer Law Group LLP

(57) ABSTRACT

A system and method for providing a sort in a computer system is disclosed. The sort is based on a plurality of values of a key. Each of the plurality of items has an associated value of the plurality of values. The method and system include providing a new item of the plurality of items to a plurality of sort cells. The new item includes a new value of the plurality of values. The plurality of sort cells is for sorting the plurality of items. Each sort cell is for sorting a corresponding item of the plurality of items. The corresponding item has a corresponding value of the plurality of values. The method and system further include comparing the new value to the corresponding value for each of the plurality of sort cells to determine whether to retain the corresponding item. Each of the plurality of sort cells retains the corresponding item if the corresponding item is to be retained. For each of the plurality of sort cells, the method and system determine whether to accept the new item or an item corresponding to the previous sort cell if the corresponding item is not to be retained. If the corresponding item is not to be retained, the method and system allow a sort cell to accept the new item or the item corresponding to the previous sort cell.

30 Claims, 8 Drawing Sheets

200

METHOD AND SYSTEM FOR PROVIDING A HARDWARE SORT IN A GRAPHICS SYSTEM

This application is a continuation of application Ser. No. 09/583,063, filed May 30, 2000, now U.S. Pat. No. 6,377,258.

CROSS-REFERENCE TO RELATED APPLICATIONS

The present application is related to co-pending U.S. patent application Ser. No. 08/624,261 now U.S. Pat. No. 5,926,181 entitled "Method and Apparatus for Identifying and Eliminating three-dimensional Objects Visually Obstructed from a Planar Surface" filed on Mar. 29, 1996. The present application is also related, to U.S. patent application Ser. No. 08/624,260 now U.S. Pat. No. 5,963,210 entitled "Graphics Processors, System and Method for Generating Screen Pixels in Raster Order Utilizing a Single Interpolator" filed on Mar. 29, 1996.

FIELD OF THE INVENTION

The present invention relates to computer systems, and more particularly to a method and system for providing a hardware sort which is simple to design, simple to use, fast, and applicable to computer graphics system.

BACKGROUND OF THE INVENTION

Many computer systems must sort items based on the value of a key in order to achieve certain functions. Such computer systems conventionally employ a software sort. For example, computer graphics systems may utilize a software sort in order to render an image. In current computer graphics systems, images of three-dimensional objects can be depicted on a two dimensional display. In order to give the illusion of depth, computer graphics systems use each objects "z value," the distance of each object to the viewing plane. In particular, the objects are ordered based on each object's z value. Thus, the key for such sort is the z value. Once the objects are sorted according to their z values, the computer graphics system can correctly blend the colors of translucent objects and opaque objects that can be seen through the translucent objects to achieve the proper color to be displayed for each pixel.

In a conventional computer graphics system, the software sort occurs when a display list is generated through an application. The display list orders three-dimensional objects based on a key, typically the z value. The display list typically orders translucent object from back to front. Thus, the display list sorts translucent objects. Although they may appear on the display list, opaque objects are typically sorted using a conventional Z buffer.

Placing the objects in the order prescribed by the display list allows the computer system to properly depict the images of the three-dimensional objects on the display. Hardware in the computer graphics system utilizes the display list, a frame buffer, and a z buffer to render the three-dimensional objects in the order dictated by the display list. The frame buffer and z buffer describe a portion of a three-dimensional object that is to be rendered. The frame buffer includes data such as color and alpha values for the portion of the object, while the z buffer includes corresponding the z values. The conventional computer graphics system provides the objects described in the frame and z buffers to the display screen in the order prescribed by the display list. Consequently, solid objects are rendered first, then translucent objects are rendered from back to front. Thus, the display list generated by software is used to render the three-dimensional objects.

Although conventional computer graphics systems are capable of depicting three-dimensional objects, the software sort required to provide the display list can be relatively slow. If the software sort is optimized, the sort time can be reduced to a limited extent. However, development time for the software sort is significantly increased. Moreover, changes to the display list and the software sort creating the display list may be difficult to implement. Finally, since the hardware requires a display list in order to properly render the objects, the computer system is limited to using those applications which provide a sorted display list. Without the display list and the attendant software sort, the computer system may not be able to properly depict three-dimensional objects.

Accordingly, what is needed is a system and method for sorting items which does not require a sort performed by software. It would also be beneficial if the system and method could be implemented in a computer graphics system for providing a two dimensional image of three-dimensional objects. The present invention addresses such a need.

SUMMARY OF THE INVENTION

The present invention provides a method and system for providing a sort in a computer system. The sort is based on a plurality of values of a key. Each of the plurality of items has an associated value of the plurality of values. The method and system comprise providing a new item of the plurality of items to a plurality of sort cells. The new item includes a new value of the plurality of values. The plurality of sort cells is for sorting the plurality of items. Each sort cell is for sorting a corresponding item of the plurality of items. The corresponding item has a corresponding value of the plurality of values. The method and system further comprise comparing the new value to the corresponding value for each of the plurality of sort cells to determine whether to retain the corresponding item. Each of the plurality of sort cells retains the corresponding item if the corresponding item is to be retained. For each of the plurality of sort cells, the method and system determine whether to accept the new item or an item corresponding to the previous sort cell if the corresponding item is not to be retained. If the corresponding item is not to be retained, the method and system allow a sort cell to accept the new item or the item corresponding to the previous sort cell.

According to the system and method disclosed herein, the present invention provides a hardware sort which is simple to implement and modify, fast, and applicable to computer graphics systems.

DETAILED DESCRIPTION OF THE INVENTION

The present invention relates to an improvement in computer systems which sort items based on a key. The following description is presented to enable one of ordinary skill in the art to make and use the invention and is-provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Many conventional systems achieve a particular desired result by sorting items based on the value of a key associated with the items. For example, computer graphics systems which depict images of three-dimensional objects on a two dimensional display use a software sort to create the illusion of depth. The key that is used for this software sort is typically an object's "z value", or distance from the viewing plane at a particular pixel.

Figure 1:
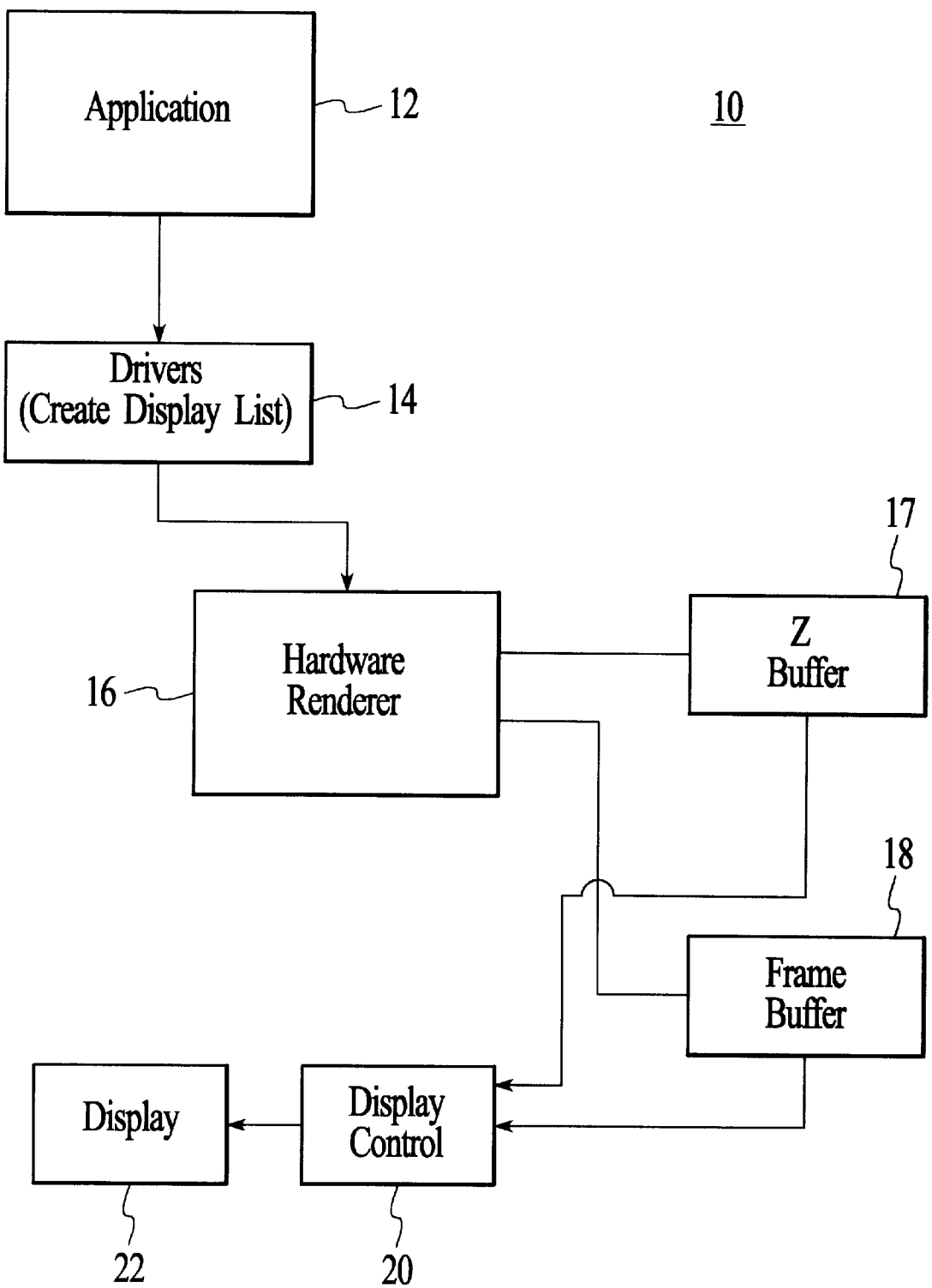
FIG. 1 is a block diagram of a conventional system for depicting three-dimensional objects on a two dimensional display.

FIG. 1 depicts a block diagram of a conventional system 10 for providing a two dimensional display of three-dimensional objects. Typically, the three-dimensional objects are broken into polygons, such as triangles, for display. Consequently, rendering a three dimensional object will be discussed in the context of rendering polygons. A software application 12 is used to display the polygons. The application 12 calls drivers 14 which create a display list.

The display list contains the x, y, and z coordinates, alpha or blending value, color, and other information for each polygon. The display list also lists the information relating to each polygon in the order in which the polygons will be rendered to the display 22. The display list typically places polygons which are part of opaque or solid objects first on the display list. These opaque objects are typically sorted by a z-buffer 17, described below. The polygons for translucent objects are generally next on the display list. The translucent polygons are ordered from back to front, or highest to lowest z value, on the display list. The ordering of the polygons allows the computer system to properly depict the images of the three-dimensional objects on the display. The drivers 14 sort the translucent polygons based on the z value of each polygon in order to create the display list. Note that in general, a polygon may contain a range of z values. Consequently, the sort provided by the display list may actually be more complex to take into account the range of z values. Thus, in the conventional computer graphics system 10, the translucent polygons are sorted by software to determine the order in which the objects will be rendered to the display.

Once the polygons are properly ordered in the display list, a hardware renderer 16 can begin the process of rendering the polygons to the display 22. The display list is provided to the hardware renderer 16, which prepares data relating to the polygons for display. The hardware renderer 16 creates a z buffer 17 and a frame buffer 18 to store data relating to each of the polygons. The z buffer 17 includes the z values for each pixel in the polygon. The frame buffer 18 includes the colors for each pixel in the polygon.

For each polygon on the display list, data from the z buffer 17 and frame buffer 18 are then provided to the display controller 20. The display controller 20 then outputs the data on the display 22. Thus, each polygon is rendered in the order dictated by the display list. Because the polygons are rendered in the order prescribed by the display list, the conventional system 10 can correctly blend the colors of translucent objects and opaque objects that can be seen through the translucent objects to achieve the proper color for each pixel to be displayed.

Although the conventional system 10 shown in FIG. 1 is capable of displaying three-dimensional objects on a two dimensional display, those with ordinary skill in the art will realize that the software sort required to provide the display list has several disadvantages. The software sort can be relatively slow if not optimized. If the software sort is optimized, the time required to perform the software sort can be reduced to a certain extent. However, development time for the software sort is significantly increased. Moreover, changes to the display list and the software sort creating the display list may be difficult or time consuming to implement. Finally, the fact that the hardware renderer 16 requires the data to be provided in the order of the display list limits the computer system 10 to using applications 12 which provide the translucent polygons sorted on the display list and, therefore, perform a software sort. Without having the translucent polygons properly sorted in the display list, the computer system 10 may not be able to properly depict three-dimensional objects.

The present invention provides a method and system for providing a sort in a computer system. The sort is based on a plurality of values of a key. Each of the plurality of items has an associated value of the plurality of values. The method and system comprise providing a new item of the plurality of items to a plurality of sort cells. The new item includes a new value of the plurality of values. The plurality of sort cells is for sorting the plurality of items. Each sort cell is for sorting a corresponding item of the plurality of items. The corresponding item has a corresponding value of the plurality of values. The method and system further comprise comparing the new value to the corresponding value for each of the plurality of sort cells to determine whether to retain the corresponding item. Each of the plurality of sort cells retains the corresponding item if the corresponding item is to be retained. For each of the plurality of sort cells, the method and system determine whether to accept the new item or an item corresponding to the previous sort cell if the corresponding item is not to be retained. If the corresponding item is not to be retained, the method and system allow a sort cell to accept the new item or the item corresponding to the previous sort cell.

The present invention will be described in terms of a computer graphics system which sorts fragments using a specified number of sort cells. However, one of ordinary skill in the art will readily recognize that this method and system will operate effectively for other computer systems which sorts other items and for another number of sort cells.

Figure 2:
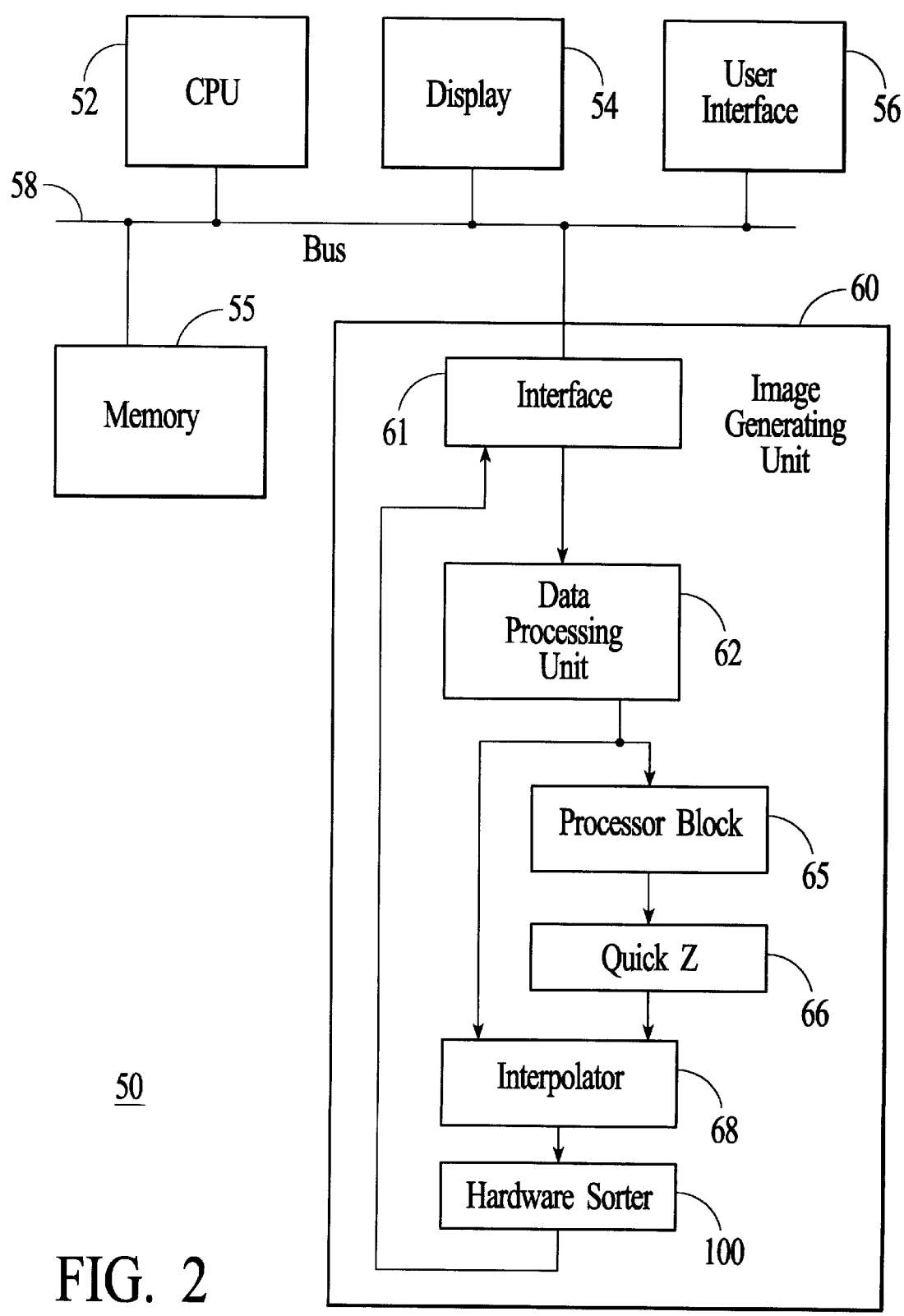
FIG. 2 is a block diagram depicting a computer graphics system utilizing the system and method in accordance with the present invention.

To more particularly illustrate the method and system in accordance with the present invention, refer now to FIG. 2 depicting a computer graphics system 50 in which the present invention could be implemented. The computer system 50 is described more completely in co-pending U.S. patent application Ser. No. 08/624,261 now U.S. Pat. No.

5,926,181 entitled "Method and Apparatus for Identifying and Eliminating Three-Dimensional Objects Visually Obstructed from a Planar Surface". The computer graphics system 50 includes a central processing unit (CPU) 52, a display 54, a user interface 56 such as a keyboard or mouse or other communicating device, a memory 55, and an image generating unit 60 coupled with a bus 58. Note, however, that nothing prevents the method and system from being implemented in a different computer system having other components.

The image generating unit includes an interface 61 connected to the bus 58. The interface 61 transmits data to a data processing unit 62. A processor block 65 is coupled with the data processing unit 62. The processor block 65 identifies data describing polygons ("intersecting polygons") which intersect a z axis extending from a selected pixel in an x-y plane corresponding to a screen of the display 54. In a preferred embodiment, the processor block 65 includes a processor for each polygon that may intersect the z axis extending from the selected pixel. The data associated with an intersecting polygon is termed a fragment. Thus, data relating to each selected pixel includes fragments for each of the intersecting polygons.

A quick z unit 66 receives the fragments from each intersecting polygon associated with the selected pixel and removes fragments for certain polygons which are obstructed without determining the precise z value of the polygon. The quick z 66 is described more completely in co-pending U.S. patent application Ser. No. 08/624,261 now U.S. Pat. No. 5,926,181 entitled "Method and Apparatus for Identifying and Eliminating Three-Dimensional Objects Visually Obstructed from a Planar Surface". The interpolator 68 receives the fragments for the polygons intersecting the particular pixel and interpolates the data, including interpolating texture, color, and alpha values for the fragment. The interpolator 68 provides the fragments for each of the intersecting polygons to a hardware sorter 100 constructed in accordance with the present invention. The hardware sorter 100 sorts the fragments for the intersecting polygons based on the value of a key associated with the fragment. In a preferred embodiment, the key is the z value for the fragment at the selected pixel.

Figure 3:
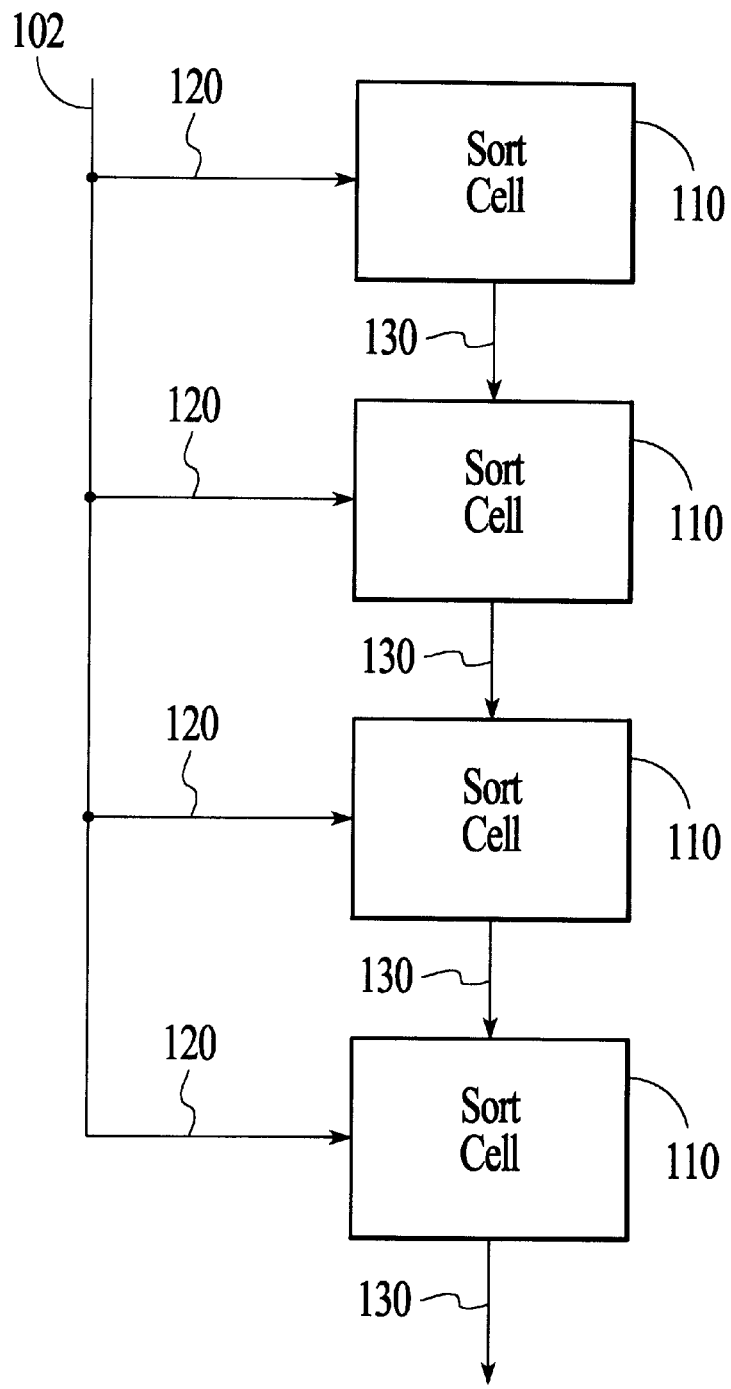
FIG. 3 is a block diagram of one embodiment of a system in accordance with the present invention.

To more particularly illustrate the hardware sorter 100 in accordance with the present invention, refer now to FIG. 3 depicting one embodiment of the hardware sorter 100. Note that although the hardware sorter 100 is described in conjunction with the computer graphics system 50, nothing prevents the use of the hardware sorter 100 in another computer system Thus, the hardware sorter 100 will be described as sorting based on a particular key (the z value) associated with a particular item (the fragment for an intersecting polygon for a selected pixel). However, nothing prevents the hardware sorter 100 from sorting based on another key or accepting other types of data. Thus, the hardware sorter 100 is applicable to other systems requiring a sort, such as a router in a network.

The hardware sorter 100 includes a plurality of sort cells 110. Note that although only four sort cells 110 are depicted, nothing prevents the hardware sorter 100 from having another number of sort cells 110. In a preferred embodiment, the number of sort cells 110 is at least equal to the number of items to be sorted. Thus, in a preferred embodiment, the number of sort cells 110 is the same as the number of processors in the processor block 65. Also in a preferred embodiment, the number of sort cells is sixteen. However, nothing prevents the use of another number of sort cells 110. Similarly, nothing prevents the number of sort cells 110 from being different from the number of processors in the processor block 65.

Alternate embodiments of the present invention can also be used where overflow may occur. Overflow occurs where there are more items to sort than there are sort cells. The alternate embodiments used for overflow cases may depend on the application for which the hardware sorter 100 is used. For example, where the embodiment is used in a computer graphics system subject to overflow, fragments which are determined to be "solid" may be passed through the hardware sorter 100. In such a case, the hardware sorter 100 will only sort non-solid fragments. The solid fragments may be sorted in a different portion of the image generating unit 60. Note that in such an embodiment, "non-solid" may apply to partial fragments such as those generated by anti-aliasing. Moreover, whether a fragment is solid or non-solid need not be based solely on a fragment's alpha value.

The hardware sorter 100 further includes a new input line 102 for providing a new fragment in parallel to each of the sort cells 110 via new input 120. Each sort cell 110 also includes an output 130. The output 130 of a sort cell 130 is coupled to an input of a next sort cell 110. The output 130 of the last sort cell 110 is not coupled to another sort cell 110. Instead, the output 130 of the last sort cell 110 provides the output of the hardware sorter 100. Although not depicted in FIG. 3, in an alternate embodiment, each sort cell could have another number of new input lines 102, another number of outputs 130, and/or another number of inputs. In such a system each sort cell 110 could sort another number of fragments.

Figure 4:
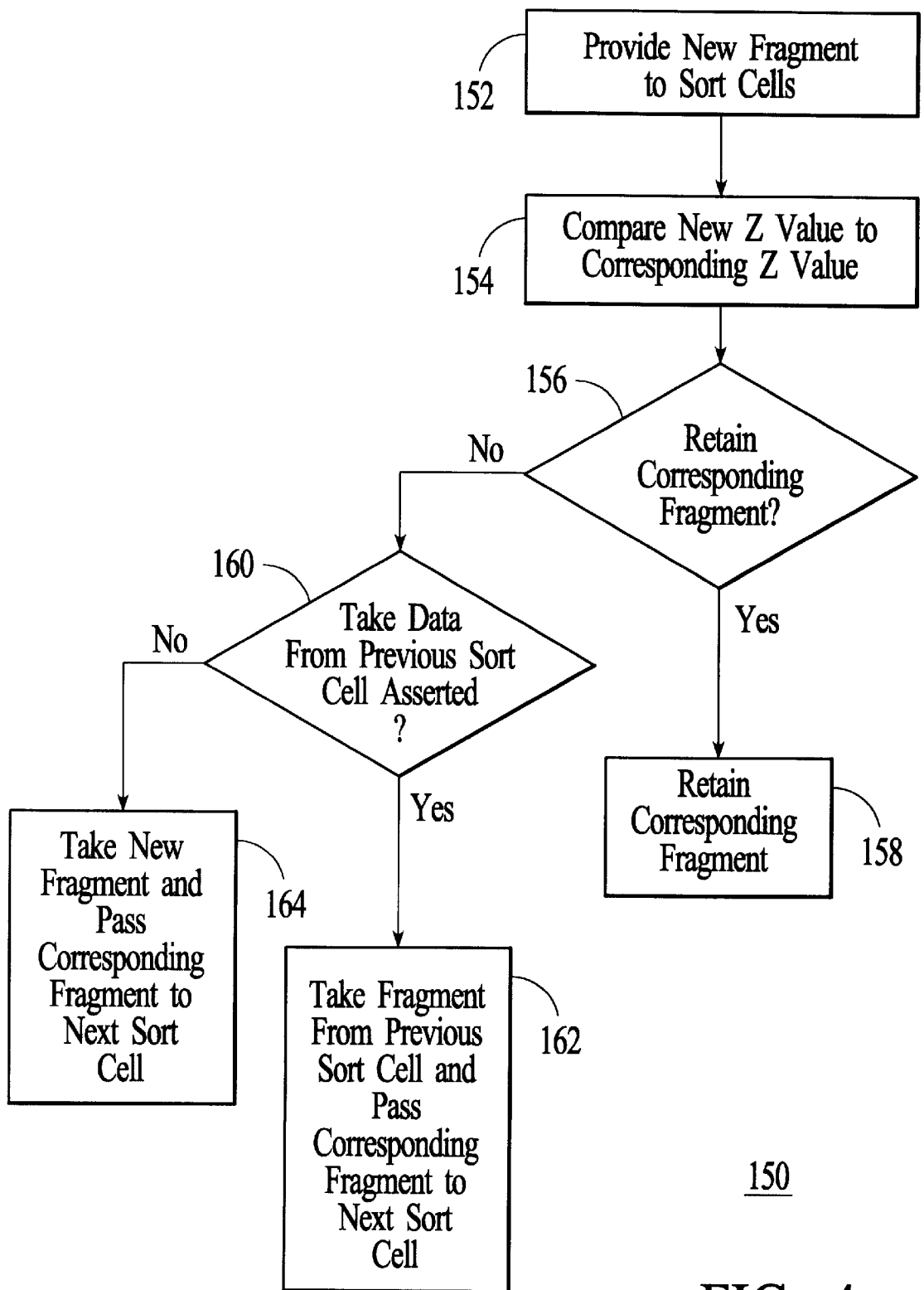
FIG. 4 is a flow chart of a method for providing a sort in accordance with the present invention.

Refer now to FIG. 4 depicting a method 150 in accordance with the present invention which uses the hardware sorter 100. Each sort cell 110 may have a fragment which corresponds to it ("corresponding fragment"). Each corresponding fragment includes a corresponding z value, which is used to sort the fragment, and corresponding data, such as color and alpha values for the corresponding fragment. A new fragment, including the new z value, is broadcast to each of the plurality of sort cells 110, via step 152. Note that in a preferred embodiment, if the new fragment is the first fragment for a pixel, the first fragment is also placed in the first sort cell 110. Where the new fragment is a first fragment for a pixel when the hardware sorter 100 is empty, the first fragment is placed in the first sort cell 110. Preferably, this is accomplished by indicating that data in other sort cells 110 is invalid. However, nothing prevents the present invention from using another method for placing the first fragment in the first sort cell 110 when the hardware sorter 100 is empty.

Steps 154 through 164 are performed for each sort cell 110 in the hardware sorter 100 that takes part in the sort. The new z value for the new fragment is compared to the corresponding z value via step 154. Based on this comparison, each sort cell 110 retains the corresponding fragment, accepts the new fragment, or accepts the fragment corresponding to a previous sort cell 110. Thus, it is determined whether the sort cell 110 will retain the corresponding fragment, including the corresponding z value, via step 156. If the corresponding fragment is to be retained, then the sort cell 110 keeps the corresponding fragment via step 158. If the corresponding fragment is not to be retained, then in step 160 it is determined whether the sort cell 110 is to take the fragment corresponding to a previous sort cell 110. If the sort cell 110 is to accept this fragment, the sort cell 110 takes the fragment corresponding to the previous cell and passes its corresponding fragment to be accepted by the next sort cell 110 via step 162. If the fragment is not to be taken by the sort cell 110, the sort cell 110 takes the new fragment and passes its corresponding fragment to be accepted by the next cell in step 164. As a result, the new fragment is inserted into the hardware sorter 100 in the appropriate sort cell 110. This process continues to sort all of the fragments provided to the hardware sorter.

Figure 5:
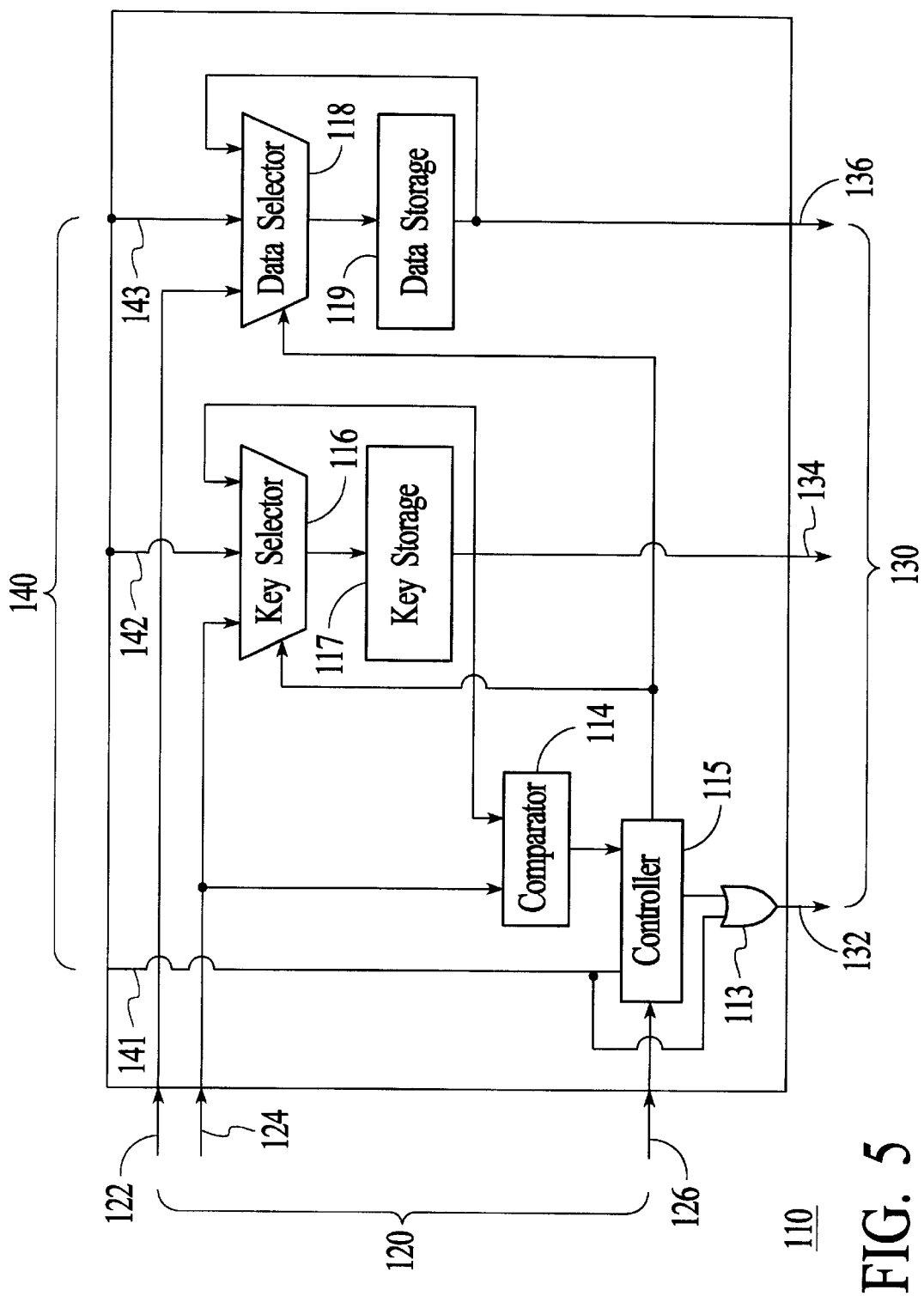
FIG. 5 is a block diagram depicting one embodiment of a sort cell in accordance with the present invention.

Refer now to FIG. 5 depicting one embodiment of a sort cell 110 in accordance with the present invention. The sort cell 110 is coupled to a new input 120. The new input 120 includes a new data input 122, a new key input 124, and a new identification input 126.

The sort cell 110 includes an input 140 and an output 130. The input 140 includes a control signal input 141, a previous key input 142, and a previous data input 143. The output 130 includes a control signal output 132, a key output 134, and a data output 136. The sort cell 110 also includes an OR gate 113 which combines the control signal input with a control signal provided by the controller 115 to be output on the control signal output 132. In a preferred embodiment, the control signal output 132 is coupled to the control signal input 141 of a next sort cell. The key output 134 is coupled to the key input 142 of the next sort cell. Also in a preferred embodiment, the data output 136 is coupled to the data input 143 of the next sort cell. Consequently, to pass a corresponding fragment to the next sort cell 110, the corresponding key and data are provided over the key output 134 and the data output 136.

The sort cell 110 further includes a comparator 114 and a controller 115 coupled with the comparator 114. In addition, the sort cell 110 contains a key selector 116, a key storage 117, a data selector 118 and a data storage 119. The corresponding key is stored in the key storage 117. The corresponding data for the corresponding fragment is stored in the data storage 119. Note that although the sort cell 110 is depicted as having key storage 117 and data storage 119 internal to the sort cell 110, nothing prevents the method and system from storing the key and/or the data in a location remote from the sort cell 110, such as in a random access memory. The key selector 116 and data selector 118 are controlled by a controller 115. The controller 115 can also provide a "take data" signal which is ORed with a previous cell's "take data" signal by the OR gate 113. This combination signal is provided to the control signal output 132. Thus, when either a previous sort cell 110 or the current sort cell 110 provides a "take data" signal, the current sort cell 110 also asserts a "take data" signal over the control signal output 132. When a "take data" signal is asserted over control signal output 132, the next sort cell 110 will accept the corresponding fragment previously stored in the sort cell 110.

In one embodiment, the key selector 116 and data selector 118 are multiplexers. The key selector 116 selects between the new key, a key corresponding to a previous cell input through previous key input 142, and a new key input from new key input 122. Similarly, the data selector selects between the new data provided by the new data input 124, data corresponding to a previous sort cell 110 that is provided through previous data input 143, and the corresponding data.

In a preferred embodiment, fragments for pixels in a scan line are provided one after another to the hardware sorter 100. As a result, the hardware sorter 100 should be capable of sorting the fragments for one pixel without affecting the order of the fragments for another pixel. This capability can be provided using the controller 115 and a pixel identification. Consequently, in a preferred embodiment, each fragment for a pixel includes a pixel identification. The new identification is provided to the sort cell 110 through the new identification input 126.

In a preferred embodiment, the pixel identification is provided by a counter, not shown. Also in a preferred embodiment, each fragment has a fragment type associated with it. Preferably, there are four fragment types, N, L, E and EOL. An N fragment is simply an nth fragment in the pixel. This could be any fragment for the pixel except for the last fragment. An L fragment is a last fragment for a particular pixel. An E (empty) fragment indicates that there are no intersecting polygons for the pixel. An EOL fragment indicates that the hardware sorter 100 should be flushed, for example due to an end of line or end of frame.

In the preferred embodiment the fragment types are transformed to an identification by the counter, not shown. The counter provides a unique number for a set of fragments corresponding to a particular pixel. The counter does so by incrementing after every L or E fragment. Consequently, all fragments for the first pixel have an identification of one. All fragments for the second pixel have an identification of two. The identification for each pixel may be incremented until an EOL fragment which flushes the hardware sorter 100 is reached. This identification is provided to each of the sort cells 110 along with the fragment. Consequently, in a preferred embodiment, a corresponding fragment for a particular sort cell 110 includes a corresponding identification in addition to the corresponding z value and the corresponding data.

Note, however, the identification merely allows the hardware sorter 100 to distinguish between different pixels having fragments in the hardware sorter 100 at the same time. Because there are N sort cells 110 in the hardware sorter 100, there can be at most fragments for N different pixels in the hardware sorter 100. Consequently, the identification may represent up to only N different values to ensure that each fragment in the hardware sorter 100 can be associated with a unique pixel. For example, for a hardware sorter 100 having four sort cells 110, an identification having only two bits (four different values) can be used. The counter can run, reusing values for pixels which cannot both have fragments in the hardware sorter 100 at the same time.

Figure 6:
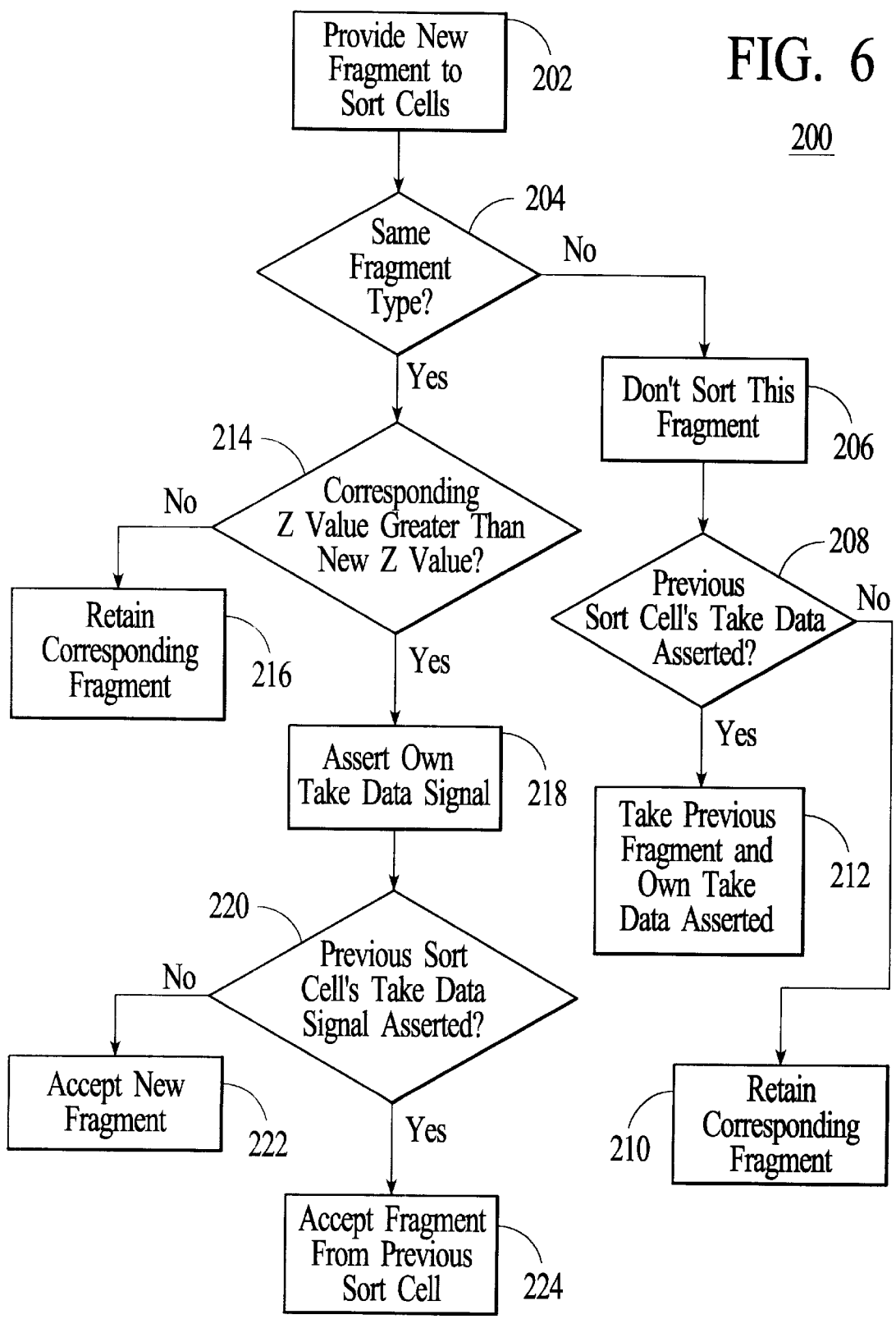
FIG. 6 is a detailed flow chart of a method for providing a sort in accordance with the present invention.

To more particularly describe the operation of the hardware sorter 100, refer to FIGS. 3, 5, and 6. FIG. 6 depicts a method 200 for providing a hardware sort using the identification in accordance with the present invention. In step 202, a new fragment is provided to all of the sort cells 110 through the new input line 102 and new input 120. The new fragment includes the new z value, new data and new identification. In a preferred embodiment, the new z value for the fragment is provided to each sort cell 110 via the new key input 124. Similarly, the new data is provided via the new data input 122. The new identification is provided through new identification input 126. If the new fragment is the first fragment for a pixel, then the new fragment is automatically input to the first sort cell 110.

The steps 204 through 224 for the method 200 are performed by each sort cells 110 that is taking part in the sort. In step 204, it is determined if the new identification is the same as the corresponding identification. In a preferred embodiment, step 204 is performed by the controller 115. Depending on whether the new identification is the same as the corresponding identification, the sort cell 110 behaves differently.

If the identifications match, the comparator 114 is used to compare the new z value to the corresponding z value, via step 214. In one embodiment, this comparison determines whether the corresponding z value is greater than the new z value. In the embodiment depicted in FIG. 4, the results of the comparison are provided to the controller 115. However, nothing prevents the resultant of the comparator 114 from being used directly to control the key selector 116, the data selector 118, or generate a signal over control signal output 132.

If the corresponding z value is not greater than the new z value, the then the new fragment will not displace the corresponding fragment or the fragment corresponding to any sort cell 110 located prior to the sort cell 110. Thus, if the corresponding z is not greater than the new z, the sort cell 110 retains the corresponding fragment via step 216. In a preferred embodiment, the corresponding z value and data are retained in step 216 because the controller 115 signals the selectors 116 and 118 to choose the input from the key storage 117 and data storage 119, respectively.

When the resultant of the comparator 114 indicates that the corresponding z value is greater than the new z value, the sort cell 110 will not retain its state. Consequently, the "take data" signal is asserted via step 218. In a preferred embodiment, the "take data" signal is simply the resultant of the comparator 114 indicating that the corresponding z value is greater than the new z value. To determine what the sort cell 110 will do, the controller determines whether the "take data" signal from a previous sort cell has been asserted via step 220.

When the corresponding fragment (z value and data) is not to be retained, the sort cell 110 must determine whether to accept the new key and data provided over lines 124 and 122, respectively, or to accept the z value and data from a previous cell provided via previous key input 142 and previous data input 143. Consequently, the controller 115 determines whether the "take data" signal from a previous cell has been asserted over the control signal input 141 via step 220. If the "take data" signal is not asserted, then the sort cell 110 accepts the new fragment via step 222. Consequently, when the resultant of the comparator 114 indicates that the corresponding z value is greater than the new z value and the take data signal from the previous sort cell is not provided via control signal input 141, the controller 115 allows the sort cell 110 to accept the new data. To do so, the controller provides the selectors 116 and 118 with a signal indicating that the values from the new key input 124 and the new data input 122 are to chosen. The new z value and new data are then stored in the key storage 117 and data storage 118, respectively.

If the "take data" signal is asserted over the control signal input 141, then via step 224 the sort cell 110 accepts the fragment corresponding to the previous cell. Consequently when the resultant of the comparator 114 indicates that the corresponding z value is greater than the new z value and the "take data" signal from the previous sort cell 110 is provided via control signal input 141, the controller 115 allows the sort cell 110 to accept the z value and data corresponding to a previous cell. To do so, the controller provides the selectors 116 and 118 with a signal indicating that the values from the previous key input 142 and the previous data input 143 to the selectors 116 and 118 are to be selected. Thus, the z value and data corresponding to the previous cell are stored in the key storage 117 and data storage 118, respectively.

If the identifications do not match, then via step 206, it is ensured that the new fragment is not sorted by the sort cell 110. In a preferred embodiment, step 206 is performed by turning off the comparator 114 for the sort cell 110. Turning the comparator off assures that the sort cell 110 will not accept the new data, thereby preventing the new fragment from being sorted with fragments for another pixel. The controller 115 then determines if the "take data" signal from the previous cell has been provided to the sort cell 110 via step 208. If the "take data" signal has not been asserted, then the sort cell 110 retains the corresponding fragment via step 210. In a preferred embodiment, the controller accomplishes this by controlling the selectors 116 and 118 to choose the input from the key storage 117 and data storage 119, respectively. If the "take data" signal has been asserted, then via step 212, the sort cell 110 accepts the fragment from the previous sort cell 110 and, due to the OR gate 113, asserts the "take data" signal over the control signal output 132.

Note that for the first sort cell 110 in the hardware sorter 100, a take data signal is never asserted over the control signal input 141. As a result, the first sort cell 110 will only transfer its corresponding fragment to the second sort cell when its corresponding z value is less than the new z value, a fragment for a new pixel arrives, or the hardware sorter 100 is flushed. Thus, the z value for the fragment stored in the first sort cell 110 is the smallest for a particular pixel.

In a preferred embodiment, the pixels input to the hardware sorter 100 will be output in order. The OR gate 113 in each sort cell 110 allows the hardware sorter 100 to accomplish this. A first fragment for a current pixel is input to the first sort cell 110. As subsequent fragments for the current pixel are sorted by the hardware sorter 100, the "take data" signal may be asserted by a sort cell 110 near the top of the hardware sorter 100. Because of the OR gate 113, each subsequent sort cell 110 will assert the "take data" signal over the control signal output 132. As a result, fragments for prior pixels and fragments for the current sort cell which have a higher z value are passed down the hardware sorter 100 in order. Eventually, the fragments for these pixels are output by the last sort cell 110 in the hardware sorter. As a result, the pixels pass through the hardware sorter 100 in order and the fragments for each pixel are properly sorted. In a preferred embodiment, at the end of a line, an EOL fragment causes the "take data" signal to be asserted by all of the sort cells 110. As a result, the hardware sorter 100 is flushed. Consequently, the system 50 is synchronized, ensuring that pixels are written at a particular time.

In a preferred embodiment, the new fragment is broadcast in parallel to the sort cells 110 in a first clock cycle. In the same clock cycle, the sort cells perform a comparison, insert the new fragment in the appropriate place, and, if necessary, move fragments which are displaced by the new fragment farther down the hardware sorter 100. Consequently, each new fragment is sorted in a single cycle in a preferred embodiment. The number of sort cells is based on the order of the number of fragments to be sorted. As a result, the number of cycles between providing a pixel to the first cell of the hardware sorter 100 and providing the sorted pixel to the output of the last sort cell 110 is substantially the same as the number of sort cells 110. In general, this time is at least as good as the time achieved by an optimized software sort. Although there may be a delay between the first pixel being input to the hardware sorter 100 and the first pixel being output by the hardware sorter 100 ("latency"), the sort for each pixel is performed in a single clock cycle. Therefore, a sort performed in accordance with the present invention is typically faster than an optimized software sort.

Figure 7:
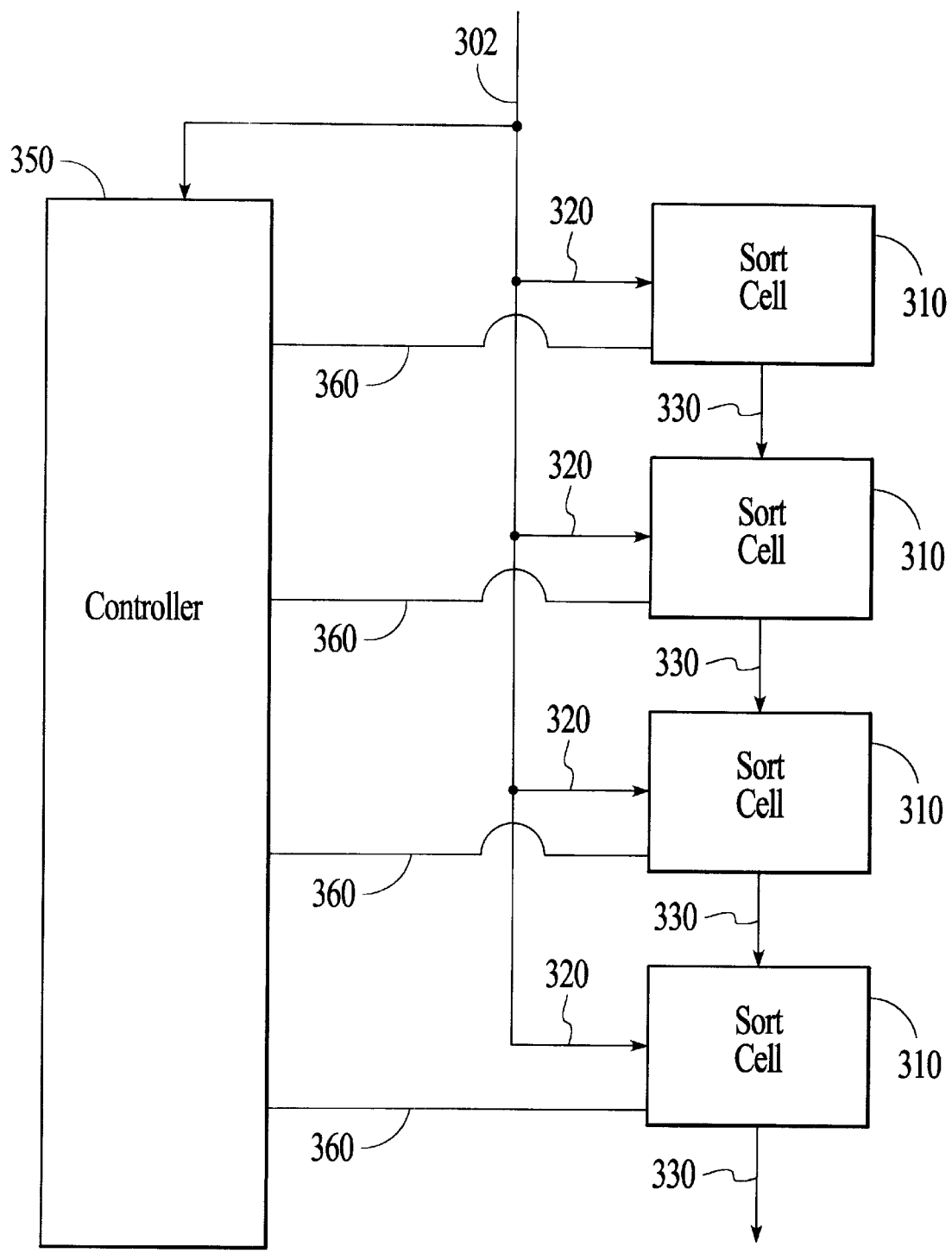
FIG. 7 is a block diagram of a preferred embodiment of a system in accordance with the present invention.

Although FIG. 5 depicts each sort cell 110 as having an internal controller 115, in a preferred embodiment, the controller 115 for each sort cell is combined to a single controller outside of the sort cells. FIG. 7 depicts a preferred embodiment of a hardware sorter 300 in accordance with the present invention. Note that although the hardware sorter 300 will be described in conjunction with the computer graphics system 50, nothing prevents the use of the hardware sorter 300 in another computer system. Thus, the hardware sorter 300 will be described as sorting based on a particular key (the z value) associated with particular data (the fragments for a pixel including color and alpha values) nothing prevents the hardware sorter 300 from sorting based on another key or accepting other types of data. Thus, the hardware sorter 300 is applicable to other systems requiring a sort, such as a router in a network.

The hardware sorter 300 includes a plurality of sort cells 310. Note that although only four sort cells 310 are depicted, nothing prevents the hardware sorter 300 from having another number of sort cells 310. In a preferred embodiment, the number of sort cells 310 is at least equal to the number of items to be sorted. Thus, in a preferred embodiment, the number of sort cells 310 is the same as the number of processors in the processor block 65. Also in a preferred embodiment, the number of sort cells 310 is sixteen.

The hardware sorter 300 further includes a new input line 320 for providing a new fragment in parallel to each of the sort cells 310 via new input 320. Each sort cell 310 also includes an output 330. The output 330 of a sort cell 130 is coupled to an input of a next sort cell 310. The output 330 of the last sort cell 310 is not coupled to another sort cell 310. Instead, the output 330 of the last sort cell 310 provides the output of the hardware sorter 300. The hardware sorter 300 also includes a controller 350 which controls the sort cells 310 through control lines 360.

Figure 8:
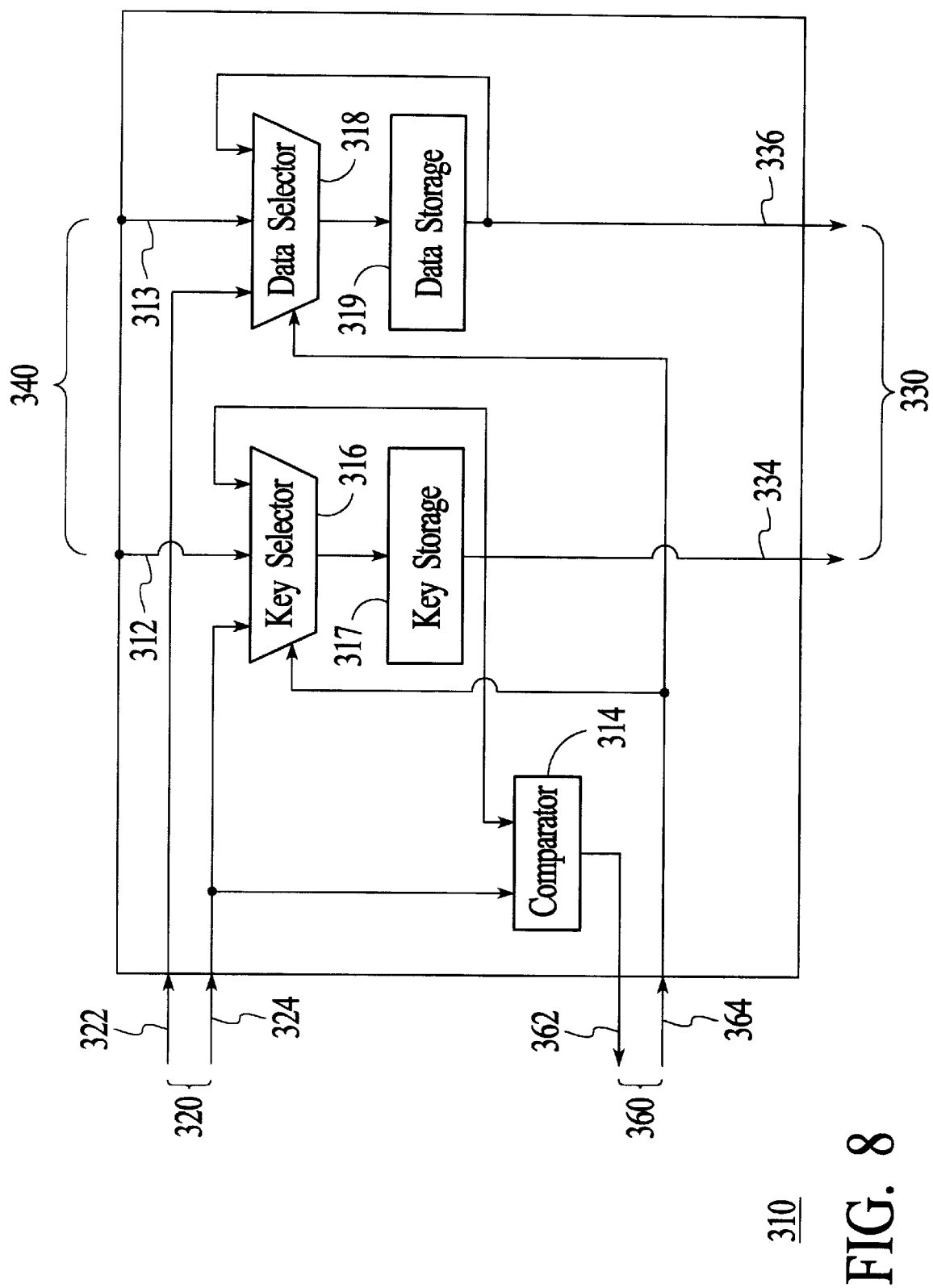
FIG. 8 is a block diagram depicting a preferred embodiment of a sort cell in accordance with the present invention.

To more particularly describe the hardware sorter 300 refer to FIG. 8, depicting a sort cell 310 in accordance with the present invention. The sort cell 310 is coupled to a new input 320. The sort cell 310 includes a control line 360, an output 330, and an input 340. The new input 320 includes new data input 322 and new key input 324. The input 340 includes previous key input 312 and previous data input 313. The output 330 includes corresponding key output 334 and corresponding data output 336. The control line 360 includes control signal output 362 and control signal input 364. The sort cell 310 also includes a key selector 316, key storage 317, data selector 318, and data storage 319. In one embodiment, the key storage 317 and data storage 319 exist outside of the sort cell 310.

The sort cell 310 and hardware sorter 300 function similarly to the sort cell 110 and hardware sorter 100, respectively. The primary difference is that the hardware sorter 300 includes a single controller 350 separate from the sort cells 300. In the hardware sorter 300, the controller 350 takes on the functions of the controllers 115 for all of the sort cells 110 in the hardware sorter 100. In addition, each sort cell 310 includes an input 364 for the signals used to control the key selector 116 and the data selector 118. The sort cell 310 also includes an output 362 to provide the resultant from the comparator 314 to the controller 350. Because the controller 350 controls all of the sort cells 310, in a preferred embodiment no control signal is passed between the sort cells 310. However, the controller 350 controls the sort cells 310 to provide the same functions as provided by the hardware sorter 100.

As discussed above, in a preferred embodiment, the hardware sorter 100 and the hardware sorter 300 include a number of sort cells on which is at least the same as the number of items to be sorted. However, nothing prevents fewer sort cells from being used. This is particularly true if an appropriate sort cell 110 or 310 were provided with a heuristic in order to choose which item to discard in the event that the number of items to be sorted is greater than the number of sort cells 110 or 310.

For example, in the computer graphics system 50, the corresponding fragment for the last sort cell 110 or 310 is the fragment farthest from the viewer. Suppose that the new fragment has a z value near that of the fragment corresponding to the last sort cell 110 or 310. A heuristic included in the last sort cell 110 or 310 could take the z value and other information into account to determine how to respond to the new fragment, for example by discarding one of the fragments. Consequently, although a preferred embodiment includes at least as many sort cells as items expected to be sorted, nothing prevents the use of fewer sort cells.

A method and system has been disclosed for providing a hardware sort. Because the new item (fragment) to be sorted can be broadcast to all sort cells in parallel and because each sort cell can simultaneously perform functions, the system and method provide an efficient sort. In addition, each sort cell can be the same as other sort cells. When the number of items sorted or size of the hardware sorter are desired to be changed, sort cells can be easily added or subtracted from the hardware sorter. Consequently, the time required to develop the method and system is reduced. In addition, because each sort cell can be made the same, the hardware sorter is a regular array. Consequently, the hardware sorter is relatively simple to lay out once the layout of a single cell is determined.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for sorting items in a computer system, the sort being based on a plurality of values of a key, each item having a value of the plurality of values, the system comprising:

a plurality of sort cells for sorting at least a portion of the plurality of items, the plurality of sort cells including a first sort cell, each sort cell of the plurality of sort cells being a hardware sort cell, each sort cell for sorting a corresponding item, the corresponding item having a corresponding value, each sort cell further having an associated key storage for storing the corresponding value, a comparator for comparing the corresponding value to a new value associated with a new item and an output, wherein each of the plurality of sort cells except the first sort cell further includes a first input, the first input of the each of the plurality of sort cells except the first sort cell being coupled with the output of a previous sort cell; and a second input coupled with each of the plurality of sort cells, the second input for providing the new item to the plurality of sort cells;

such that each of the plurality of sort cells compares the new value to the corresponding value to determine whether to retain the corresponding item and retains the corresponding item if it is determined that the corresponding item is to be retained; and such that each of the plurality of sort cells accepts either the new item or an item corresponding to the previous sort cell from the output of the previous sort cell if the corresponding item is not to be retained and provides the corresponding item over the output if the corresponding item is not retained.

2. The system of claim 1 wherein the comparator further provides a resultant, and wherein each of the plurality of sort cells further includes a controller coupled with the comparator and the storage, the controller for determining whether the corresponding item is to be retained based on the resultant and for allowing each sort cell further accept the new item or the item corresponding to the previous sort cell if the corresponding item is not to be retained.

3. The system of claim 2 wherein the output of each of the plurality of sort cells provides a signal to the next cell indicating that the corresponding item is to be accepted by the next cell if the corresponding item is not to be retained.

4. The system of claim 3 wherein the controller further determines that the corresponding item is to be retained when the comparator indicates the corresponding value is not greater than the new value.

5. The system of claim 4 wherein the controller determines that the new item is to be accepted when the corresponding value is greater than the new value and the previous cell has not provided a signal indicating that the item corresponding to the previous cell is to be accepted by the sort cell.

6. The system of claim 5 wherein the controller determines that the item corresponding to the previous cell is to be accepted when the corresponding value is greater than the new value and the previous cell has provided a signal indicating that the item corresponding to the previous cell is to be accepted by the sort cell.

7. The system of claim 6 wherein each of the plurality of items further has an identification associated with it and wherein the controller further allows the plurality of sort cells to sort the portion of the plurality of items having the same identification.

8. The system of claim 7 wherein each of the plurality of items has data associated with it and wherein each of the plurality of sort cells further has an associated data storage for storing the data associated with the corresponding item, the sort cell providing the data associated with the corresponding item over the output if the corresponding item is not to be retained, and the sort cell storing data associated with the new item or data associated with the item corresponding to the previous cell in the data storage if the corresponding item is not to be retained.

9. The system of claim 8 wherein the computer system is a computer graphics system including a display, wherein each of the plurality of items is a fragment, the key is a z value, and the data associated with the corresponding item includes color and blending data.

10. The system of claim 7 wherein each of the plurality of items has data associated with it, and wherein the system further comprises:
    data storage for storing the data associated with the corresponding item for each of the plurality of sort cells.

11. The system of claim 10 wherein the computer system is a computer graphics system including a display, wherein each of the plurality of items is a fragment, the key is a z value, and the data associated with the corresponding item includes color and blending data.

12. The system of claim 7 wherein the key storage is located remote from each sort cell.

13. The system of claim 1 wherein the comparator further provides a resultant, and wherein the system further includes:
    a controller coupled with the plurality of sort cells, the controller for determining whether the corresponding item for each of the plurality of sort cells is to be retained based on the resultant of each of the plurality of sort cells, the controller further instructing each sort cell to accept the new item or the item corresponding to the previous sort cell if the corresponding item is not retained.

14. The system of claim 13 wherein the controller further provides a signal to each of the plurality of sort cells indicating that the item corresponding to the previous sort cell is to be accepted if the corresponding item is not to be retained.

15. The system of claim 14 wherein the controller determines whether the corresponding item is to be retained when the comparator indicates the corresponding value is not greater than the new value.

16. The system of claim 15 wherein the controller determines that the new item is to be accepted when the corresponding value is greater than the new value and the previous cell has not provided a signal indicating that the item corresponding to the previous cell is to be accepted by the sort cell.

17. The system of claim 16 wherein the controller determines that the item corresponding to the previous cell is to be accepted when the corresponding value is greater than the new value and the previous cell has provided a signal indicating that the item corresponding to the previous cell is to be accepted by the sort cell.

18. The system of claim 17 wherein each of the plurality of items further has an identification associated with it and wherein the controller further allows the plurality of sort cells to sort the portion of the plurality of items having the same identification.

19. The system of claim 18 wherein each of the plurality of items further has an identification associated with it; and wherein the controller further allows the plurality of sort cells to sort the portion of the plurality of items having the same identification.

20. The system of claim 19 wherein each of the plurality of items has data associated with it and wherein each of the plurality of sort cells further includes:
    data storage for storing the data associated with the corresponding item, the sort cell providing the data associated with the corresponding item over the output if the corresponding item is not to be retained, and the sort cell storing data associated with the new item or data associated with the item corresponding to the previous cell in the data storage if the corresponding item is not to be retained.

21. The system of claim 20 wherein the computer system is a computer graphics system including a display, wherein each of the plurality of items is a fragment, the key is a z value, and the data associated with the corresponding item includes color and blending data.

22. The system of claim 19 wherein each of the plurality of items has data associated with it and wherein the system further comprises:
    data storage for storing the data associated with the corresponding item for each of the plurality of sort cells.

23. The system of claim 22 wherein the computer system is a computer graphics system including a display, wherein each of the plurality of items is a fragment, the key is a z value, and the data associated with the corresponding item includes color and blending data.

24. The system of claim 23 wherein the data storage is located remote from each sort cell.

25. A method for sorting a plurality of items in a computer system, the sort being based on a plurality of values of a key, each of the plurality of items having an associated value of the plurality of values, the method comprising the steps of:

(a) providing at least one new item of the plurality of items to a plurality of sort cell, each of the plurality of sort cells being a hardware sort cell, the at least one new item including at least one new value of the plurality of values, the plurality of sort cells for sorting the plurality of items, each sort cell for sorting at least one corresponding item of the plurality of items, the at least one corresponding item having at least one corresponding value of the plurality of values;

(b) for each of the plurality of sort cells, comparing the at least one new value to the at least one corresponding value to determine whether to retain the at least one corresponding item;

(c) for each of the plurality of sort cells, retaining the at least one corresponding item if the at least one corresponding item is to be retained;

(d) for each of the plurality of sort cells, determining whether to accept the at least one new item or at least one item corresponding to a previous sort cell if the at least one corresponding item is not retained;

(e) if the at least one item corresponding item is not to be retained, accepting the at least one new item or the item corresponding to the previous sort cell.

26. The method of claim 25 wherein the steps (a) through (e) are performed in one clock cycle.

27. The method of claim 26 wherein the at least one corresponding item further includes data associated with it, and wherein the method further comprises the step of:

(f) storing the data associated with the at least one corresponding item in a data storage, the data being retained if the at least one corresponding item is to be retained and being provided over the output if the at least one corresponding item is not to be retained.

28. The method of claim 27 wherein the computer system is a computer graphics system and the data associated with the at least one corresponding item further includes color and blending data for a particular fragment for a particular pixel on the display.

29. The method of claim 28 further comprising the steps of:

(g) providing an identification for each of the plurality of items; and (h) sorting the portion of the plurality of items having the same identification.

30. A system for sorting items in a computer system, the sort being based on a plurality of values of a key, each item having a value of the plurality of values, the system comprising:

a plurality of sort cells for sorting at least a portion of the plurality of items, each sort cell of the plurality of sort cells being a hardware sort cell, each sort cell for sorting a corresponding item, the corresponding item having a corresponding value, each of the plurality of sort cells comparing a new value to the corresponding value to determine whether to retain the corresponding item and retaining the corresponding item if it is determined that the corresponding item is to be retained, each of the plurality of sort cells accepting either the new item or an item corresponding to a previous sort cell from the previous sort cell if the corresponding item is not to be retained and provides the corresponding item to a next sort cell if the corresponding item is not retained.

* * * * *